United States Patent [19]

Rhoades et al.

[11] Patent Number: 5,054,247

[45] Date of Patent: Oct. 8, 1991

[54] METHOD OF CONTROLLING FLOW RESISTANCE IN FLUID ORIFICE MANUFACTURE

[75] Inventors: Lawrence J. Rhoades, Pittsburgh; Nicholas P. Nokovich, Greensburg; Thomas A. Kohut, North Versailles; Frank E. Johnson, North Huntington, all of Pa.

[73] Assignee: Extrude Hone Corporation, Irwin, Pa.

[21] Appl. No.: 554,379

[22] Filed: Jul. 19, 1990

Related U.S. Application Data

[63] Continuation of Ser. No. 842,285, Mar. 21, 1986, abandoned.

[51] Int. Cl.⁵ .................. B24B 57/02; B24B 49/16
[52] U.S. Cl. .................................. 51/317; 51/2 R; 51/7

[58] Field of Search ............... 51/317, 318, 2 R, 7, 51/17, 26, 281 R, 16

[56] References Cited

U.S. PATENT DOCUMENTS

| 3,521,412 | 7/1970 | McCarty | 51/2 R |
| 3,753,879 | 8/1973 | Blee | 204/129.4 |
| 4,936,057 | 6/1990 | Rhoades | 51/317 |

FOREIGN PATENT DOCUMENTS 395246  1/1974  U.S.S.R.
518326  7/1976  U.S.S.R.

Primary Examiner—Robert A. Rose
Attorney, Agent, or Firm—Waldron & Associates

[57] ABSTRACT

Fluid flow through orifices, particularly where flow rates are to be controlled or metered, is improved by employing abrasive flow machining to achieve a target flow resistance in the orifice.

11 Claims, 2 Drawing Sheets

METHOD OF CONTROLLING FLOW RESISTANCE IN FLUID ORIFICE MANUFACTURE

This is a continuation of application Ser. No. 842,285, filed Mar. 21, 1986, l now abandoned.

BACKGROUND OF THE INVENTION

Fluid flow through orifices is common. Examples include fuel injector nozzle tips, carburetor jets, cooling air flow through turbine engine components, lubricating oil metering for precision bearings and the like. In many such applications, metering of flow rates is of very great importance, but due to manufacturing artifacts, is of very great difficulty. Even very slight variations in manufacturing tolerances can produce substantial variations in flow resistance and flow.

Parts having fluid flow orifices are made by a wide variety of casting and machining procedures. For example, high quality investment castings are frequently employed for manufacture of such parts. Such parts will have variations in dimensions, particularly wall thicknesses attributable to slight core misalignments or core shifting, and other variations in surface conditions, including surface roughness, pits, nicks, gouges, blow holes, or positive metal. In the extreme, a very slight crack in a core can lead to a thin wall projecting into an internal passage. All these artifacts will substantially impede fluid flow.

Commonly employed machining methods, such as conventional drilling, electrical discharge machining and even less usual techniques as laser, electron beam, electrostream, and STEM drilling are not sufficiently precise to avoid the generation of substantial variations in flow resistance. Probably, the most precise of these, electrical discharge machining, will not produce perfectly uniform flow resistance since the length of an internal passage may vary as an incident of casting operations, giving rise to fluctuations of hole length and flow resistance despite the uniformity of the hole diameter. In addition, non-uniform EDM conditions are inevitable and may produce variations in size, shape, surface finish and hole edge conditions.

At present, such deviations are necessarily tolerated with broad limits and the attendant compromises in design freedom, performance, and efficiency are accepted as unavoidable. For example, the delivery of fuel charges to internal combustion engines by pressurized fuel injection requires metering of flow through injectors. The more precisely the flow can be regulated, the greater will be the fuel efficiency and economy of the engine operation. At present, the design of such fuel metering systems is often based on measurement of actual flow resistance and segregation of inventories within ranges of flow parameters to provide at least approximate matching of components in inventory within a range of deviation from defined tolerances. Such operations are a considerable expense because of the substantial inventory requirements. In addition, a substantial number of components must be rejected as out of allowable deviations and must be reworked at considerable expense or discarded.

At the present time, injector nozzles are machined with the critical flow metering orifices formed by electrical discharge machining. As shown in FIG. 1, the most critical flow resistance determinants are considered to be the diameter of orifices 10, 11, and wall thickness at section line A—A, as well as edge condition and surface roughness, including "lay" of the finish. The design specifications are for a wall thickness at this point of 0.040 inches±0.002 inches. Parts outside these specifications are rejected. Accepted parts are segregated in inventory into eight ranges, ±0.00025 inches. Those of ordinary skill in the art have long been aware that wall thickness at A—A is an indirect determinant of flow resistance of orifices 10, 11, and that the accurate control of the diameter of orifices 10, 11, is a direct determinant of flow resistance. These parameters determine flow metering properties, and a more direct measure of flow resistance of the part and a direct control in manufacture of such flow resistance is highly desirable.

Another example of flow resistance through an orifice of significant criticality is the provision of cooling air flow through gas turbine engine components, such as turbine blades. As shown in FIGS. 3 and 4, investment cast turbine blades are typically cast or drilled (by laser drilling, STEM drilling, or electrical discharge machining), to provide a plurality of holes, typically having a nominal diameter of about 0.010 to 0.030 inches, passing from the interior passage to the vicinity of the leading edge, trailing edge, and elsewhere along the airfoil. Cooling air is forced from the interior, out the plural holes, and into the high temperature combustion gas stream to provide cooling of the blade. Sometimes holes through internal walls of the blade meter distribution of cooling air. It is reasonably apparent that variations in flow resistance can result in different cooling effects which can result in hot spots which may alter the heat balance within the components and the engine itself and affect both performance and component life. Cooling air usage should however be minimized as its excessive usage reduces engine efficiency by "stealing" compressor section energy. More precise control of flow resistance of these orifices can provide substantial benefits in operation of such components and of the units into which they are assembled.

There are numerous other examples of flow control orifices to which the present invention is applicable, but the foregoing examples show representative examples which serve to illustrate the state of the art and the problem addressed and solved by the present invention.

It is an object of the present invention to provide a method of working flow controlling orifices in structures to attain a precise flow resistance.

It is a further object to provide such a method to provide a precise predetermined flow resistance.

Another object is to provide such a method where by a plurality of flow controlling orifices can be provided with closely matched flow resistance.

Still another object is to provide a method whereby a continuing plurality of parts can be made having predetermined flow resistance with high levels of precision and reproducibility.

Yet another object is to provide a method of attaining a predetermined flow resistance through an orifice by controlling the operation through a parameter which is a direct determinant of or a direct consequent of flow resistance.

A further object is to provide parts and components having orifices with reproducible, precise, predetermined flow resistances.

Still another object is to provide "tuned" turbine engine components.

SUMMARY AND BRIEF DESCRIPTION OF THE INVENTION

The present invention is based upon the performance of abrasive flow machining through an orifice to a constant, predetermined rate of flow of the abrasive medium, where the dynamic rate of flow of the abrasive medium is directly related to the target rate of flow of a fluid through the orifice. It will be possible to control the abrasive flow at a constant pressure or a predetermined rate of displacement of a driving piston of constant area. If either pressure or flow rate is set, the other factor will be determined by media viscosity and orifice dimension.

DETAILED DESCRIPTION OF THE INVENTION

Figure 1:
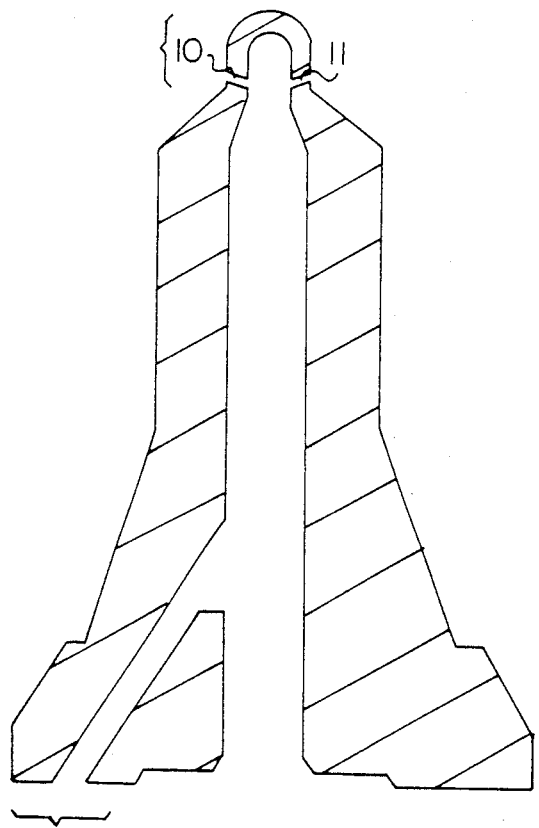
FIG. 1 is a cross-sectional view of a fuel injector metering nozzle.
Figure 2:
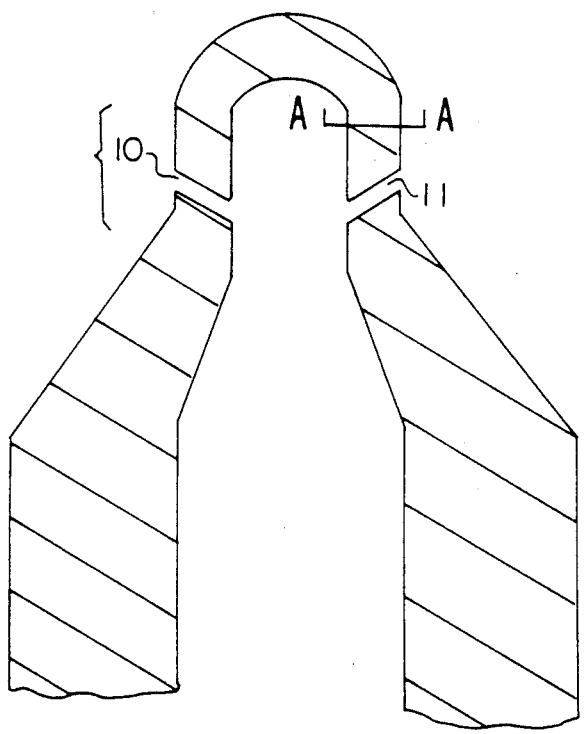
FIG. 2 is an enlarged detail view of a portion of FIG. 1, showing the metering orifices 10, 11.
Figure 3:
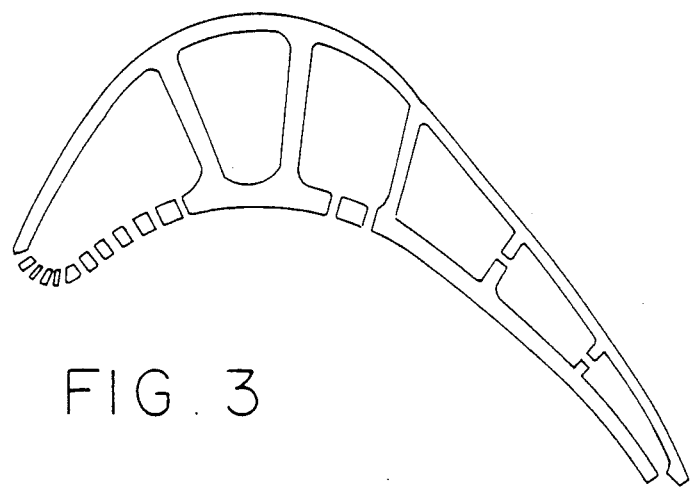
FIG. 3 is a cross-sectional view of a turbine blade showing cooling air metering orifices through the leading edge, trailing edge, air foil, and internal walls.

Abrasive flow machining is a widely employed procedure for working metals and related materials, particularly for machining and finishing operations on internal shapes, bores, apertures, complex three dimensional shapes, and other difficult operations.

Abrasive flow is particularly used for deburring, radiusing, resizing, and polishing and finishing operations, often in internal shapes which are extremely difficult to process by other machining techniques, including orifices such as those which are the principal concern of the present invention. It is known that flow resistance through an orifice is decreased by abrasive flow machining, and that an orifice can be enlarged by such operations.

Abrasive flow machining as employed in the present application refers to machining operations performed by causing a viscoelastic plastic medium containing abrasive to flow under pressure across the surfaces of a workpiece; wherever flow is restricted, the flow stream is abrasive and performs abrasive work on the workpiece. Typically, a part or workpiece is fixed in a stationary tool and the abrasive containing viscoelastic plastic medium is hydraulically pumped through the passages formed by the part and its associated tooling at substantial pressure until the desired degree of surface working is performed. Typically, hydraulic cylinders are employed to pump the medium to the appropriate extent. Areas of the workpiece that do not provide a restriction to flow are largely unworked by the procedure.

Abrasive flow machining as employed in the present application does not include flow of abrasives suspended or slurried in fluid media such as cutting fluids, honing fluids, gas streams and the like, but rather are limited to semisolid polymer compositions which form stable, non-separating dispersions of solid particulate abrasives which flow by plastic flow or "extrusion."

In the usual application of abrasive flow machining, tooling is developed to direct and confine the flow of the abrasive medium to take advantage of the foregoing properties and the part or workpiece is subjected to a plurality of cycles determined to be sufficient to perform the desired degree of light machining, normally including deburring, and/or polishing. Generally speaking, machining is attained with relatively coarse abrasive and polishing with relatively fine abrasive, although in the present context, there is no clear distinction between machining and polishing since a continuum of behavior can be attained from stock removal, leaving a relatively rough and coarse surface finish, to a very low rate of stock removal and a relatively smooth and fine and even highly polished surface finish. By taking advantage of combinations of media and extrusion pressures and rates, substantially any combination of abrasive working properties can be attained.

Abrasive flow machining incorporates the use of a plastic or semi-solid medium containing abrasive particles distributed substantially uniformly throughout. The purpose of the semi-solid medium is to transport the abrasive particles through the product being deburred in order to permit the abrasive particles to remove the upraised metal and abrade the workpiece as it passes.

Another purpose of the semi-solid medium is to hold the abrasive particles in suspension so that they will be pressed firmly against the surface of the product when the medium passes through the openings as taught hereinafter, so that the abrasive effect is at a maximum, and uniformly distributed over the surface treated.

Another purpose of the semi-solid medium is to provide a relatively firm backing for the abrasive, when the medium is under pressure, in order to increase the cutting action of the abrasive against the surface being treated, while still being plastic enough to flow through the product in order to reach all required surfaces.

It should be noted that a liquid slurry carrying abrasive material and pumped through the same kind of workpiece as treated by this invention would not have the required abrasive action nor would it strike all surfaces uniformly. Such liquid slurry would require high velocity of flow to provide maximum impingement of the abrasive particles against the surface treated. Under such conditions, some areas would receive no abrasion at all.

Some differences between the medium used for abrasive action in abrasive flow machining and those employing abrasive carried by a liquid or air or gaseous medium should be noted. In abrasive flow machining, the medium used is a semi-solid, forced through the product under pressure and with relatively low velocity in such a manner as to provide a maximum abrasive action and uniformity of finish. Processes using liquid or air as a medium rely on high velocity and low pressure. The semi-solid, difficulty flowable rheopectic medium of abrasive flow machining provides a firm matrix or support for the abrasive particle as it passes over the surface treated. Other processes using liquid or air as a medium or vehicle rely on high velocity and impingement of the abrasive particle against the workpiece. Sharp corners requiring blending usually occur at a conjunction of two surfaces. Flow through or past the product, therefore, changes direction at these points. A change of direction of flow of the present semi-solid, difficulty flowable medium, tends to increase the abrasive action of the medium in the present process at such conjunction or surfaces. A liquid or air medium, on the other hand, carrying abrasive particles, will tend toward reduced abrasive action at these points of change of direction, and, under high velocity, the turbulent flow used with such liquid and air mediums tends to create areas of no particle motion, at points of changing direction, resulting in no abrasive action at these points.

The medium for use in this invention is a semi-solid, flowable plastic material uniformly permeated with finely divided abrasive particles. It is necessary to the operation of this invention that the plastic carrier medium have sufficient body at high pressure and low velocity to press the abrasive particles against the surface to be treated with sufficient force to produce the result desired. One suitable vehicle for carrying the abrasive particles is silicone putty, i.e., poly (borosiloxane), for example, in the grade indicated by General Electric Company as SS-91. This material has a bounce or rebound of 25 to 50 percent when a twelve gram ball of the putty at 70 to 78 degrees F. is dropped from a height of 100 inches onto a smooth surfaced soapstone block. The material has a resilience of 10 percent to 20 percent when measured with a Bashore Resiliometer of the Precision Scientific Company of Chicago, at room temperature and with a special one-half ounce drop weight. The same putty has a penetration of 1.5 to 10 mm. in five seconds using a Precision Universal Penetrometer with a one-quarter inch diameter foot on a 47.5 gram test rod with no external loading This test is made at least twenty-four hours after the batch of putty is dropped or first formed in order to get a reliable test.

Obviously, the abrasive used in the carrier putty will be varied to suit the job. A satisfactory abrasive for use in working on steel is silicon carbide (SiC), which is readily obtainable in standard grit sizes. An abrasive for many applications is aluminum oxide. Other abrasives might include diamond dust, boron carbide, rouge, corrundum, garnet, alundum, glass, or in some unusual operations softer material such as fiber or shell material. Commonly, the abrasive per part of rheoplastic putty material will be from about 1/10 part to about ten parts by weight. More typically, it ranges from ⅓ part to 3 parts by weight.

It is necessary to hold the workpiece so as to confine the flow of the honing medium past the area to be treated. In the case of an opening through the workpiece, special adapters or tooling may be required to pass the honing medium into a certain opening and out of a certain opening in the workpiece. This is merely the skill of the industry.

The honing medium of this invention, which acts as a surface abrading tool, is unusual for the reason that the abrasive grain is held or contained in a random repositioning arrangement in a plastic matrix. The usual concept is that of an abrasive "stone" or lap, wherein the grain particle is fixed and presents one cutting point or edge which is maintained until dulling causes removal by means of a dressing operation. The total grain particles as used in the process of this invention are sharp until the sum of all points or edges have been exposed many times.

Heretofore, it has been usual to employ a fixed number of cycles of such abrasive flow at a fixed pumping cylinder pressure and a fixed volume of abrasive medium to perform an abrasive flow working operation. Such parameters are ordinarily determined empirically for a given workpiece and tooling combination to provide suitable results.

It should be noted that within a given flow path, localized changes in flow resistance will be created by localized perturbations in cross-section so that burrs, flashings and other projections of material into the flow path will preferentially removed. This makes abrasive flow machining particularly effective for deburring parts and workpieces, and particularly those with internal passages and bores which cannot effectively be dealt with by other, more traditional techniques. Abrasive flow machining has indeed been used for deburring in many cases involving flow controlling orifices as well as other workpieces.

It has now been discovered that in addition to all the foregoing features and uses, abrasive flow machining can be directly employed and controlled to govern flow resistance of an orifice by performing an abrasion flow machining operation to a predetermined rate of flow of the abrasive medium through the orifice at constant pressure, to a predetermined target pressure at a constant rate of flow, or other equivalent determinant of the dynamic flow resistance of the orifice being machined. It has been observed that such flow resistance during the working operation is directly correlatable with flow resistance of other fluids through such an orifice, even at greatly different pressure.

In the following discussion, the following terms are employed:

$t$ = Time at flow rate
$A_p$ = Piston Area
$P_p$ = Piston pressure applied to abrasive media
$D_p$ = Piston axial displacement distance
$V_p$ = Piston Velocity = $D_p/t$
$Q_p$ = Piston volume displacement = $A_p \times D_p$
$A_o$ = Orifice area
$P_o$ = Orifice pressure
$D_o$ = Orifice axial distance of medium flow
$V_o$ = Orifice velocity (rate) of flow of abrasive medium
$Q_o$ = Orifice volume of flow The objective attained by the present invention is to attain a predetermined value of $V_o$ at a fixed pressure $P_o$ which is related to a benchmark rate of flow of some specified fluid at some operating pressure for the orifice in its intended working environment. This is often obtained empirically, although it can theoretically be calculated based on viscosity, pressure, volume, and orifice dimensions. In manufactured parts, calculation of $V_o$ target values is difficult and uncertain and is generally not preferred.

Alternatively, specific values of $P_o$ can be targeted by flowing medium at a constant velocity $V_o$ and continuing processing until the orifice pressure drops to $P_o$.

Empirical determination of $V_o$ is readily obtained by selecting two prototypical parts having known orifices which provide known rates of flow at the proper pressure with the proper working fluid to be regulated near the target flow rate. By interpolation, these parts are employed as a comparative benchmark to measure $V_o$ at $P_o$ to establish the predetermined value of $V_o$ for use in processing for the chosen abrasive medium.

Actual values of $V_o$ are determined in accordance with the following considerations in the case of a single orifice:

| | |
|---|---|
| $Q_o = Q_p$ | by definition |
| $V_o = D_o/t$ | by definition |
| $\quad = Q_o/A_o/t$ | |
| $\quad = Q_p/A_o/t$ | |
| $\quad = A_p \times D_p/A_o/t$ | |
| $V_o = k\, D_p/t$ | where $k = A_p/A_o$, approximately constant |

Both $D_p$ and t are easy to measure to very great precision. Since k is a parameter which is approximately constant, as $A_o$ changes very slightly as the process proceeds, it is effective to treat k as a constant where the time interval, t, is small. This approximation is quite valid for time intervals, t, of less than about one second. In practice, it is often convenient to use sampling rates at an interval of t=0.1 seconds or smaller.

This determination is based on substantially, constant $P_p$, temperature, abrasive grain size, composition and concentration in the abrasive medium, and constant viscoelastic properties of the abrasive medium. These are all readily maintained within acceptable limits.

In operation, then, a determination of the target $V_o$ and k benchmarks permits matching $V_o$ of a multiplicity of pieces to the target by measuring $D_p$ and t and computing $kD_p/t$, and continuing the processing until the requisite value is attained. Processing is then terminated, the part is removed and cleaned and has the required $V_o$.

As those of ordinary skill in the art will appreciate, $P_p$ is an independent variable in the abrasive flow machining process and need not be maintained as constant. Indeed, equivalent results can be obtained if $D_p$ is maintained constant and $P_p$ is varied and measured in the operation or if both P and $D_p$ are varied and measured simultaneously. Such operations are equivalent and are considered a part of the present invention.

When multiple orifices in a single part or multiple parts are to be processed in parallel, simultaneous abrasive flow machining, the considerations are essentially the same.

Indeed, it is generally preferred that the orifice dimensions of the unworked parts be sufficiently undersized so that substantially all the parts need some machining to attain the target $V_o$ value. It is particularly preferred that at least about 5 seconds of working time be required is that there is some assurance of steady operating conditions of flow and measurement are assured. This also serves to eliminate rejection of parts for oversize orifices and, since working is continued to the target $V_o$, there will be no parts rejected for undersized orifices either.

The amount of material to be removed by the abrasive flow machining operation will, in most circumstances, be rather small, involving in most cases an enlargement of the diameter of the orifice on the order of less than a mil or a few mils or in rare instances a few tens of mils. In many cases, the radiusing of the entrance edge of the orifice alone is sufficient to significantly reduce the flow resistance of the orifice. With appropriate selection of the abrasive medium and operating parameters, these operations can be achieved in quite brief operating cycles. Care must be taken that the operating cycle is not so brief that the ability to measure and control is lost.

It is important to recognize that the method of the present invention operates to attain a specific dynamic property in the use of the orifice and not specific dimensions. For example, when the length of an orifice is greater than the designed value, due to a core shift in the casting operation for example, it will have a greater flow resistance than a short passage of exactly the same diameter. In the present invention, longer passages will be enlarged more than short ones so that the resulting resistances to flow are equalized. While it is possible to perform abrasive flow machining to dimensioned objectives, such operations are not a part of the present invention.

The influence of various orifice conditions on the flow rate of abrasive media may vary from that of the fluid the the orifice is intended to meter. For instance, surface roughness, edge radius, and orifice diameter and length may affect flow differently than air, water, or fuel. Consequently, quantifying the orifice with the appropriate "test" fluid before abrasive flow machining may be desirable. The "test" fluid flow information combined with the initial abrasive media flow rate can be incorporated into an algorithm that will target an abrasive media flow rate that will correspond to the target "test" fluid flow rate.

In the application of the present procedure to small orifices on the order of up to about 0.010 inches, it is generally desirable to employ rather fine abrasive particles, on the order of 600 to 1200 mesh and less. This will result in better control of the extent and rate of material removal from the workpiece and leave a finer surface finish than would be attained with coarser abrasives. For larger orifices, proportionately larger grain sizes would be more effective, particularly when substantial alterations in flow rate are required. It is also preferred to use hard abrasive, typically silicon carbide, to minimize the change in abrasive properties over a large number of process cycles. Use of softer abrasives may require relatively frequent replacement of the abrasive medium. The abrasive medium will require periodic replacement in any event, since abraded material will accumulate in the medium and in time begin to increase its viscosity and flow properties. This does not occur rapidly in relation to the number of parts machined, but it does represent a parameter that will require attention.

Frequent additions of a small percentage of "new" abrasive media combined with a blending operation to uniformly distribute the "new" media within the "old" can keep the mixture at a constant homogeneous condition. This can be done either manually or automatically.

EXAMPLE I

Fuel injector spray tips shown in FIG. 1 were obtained. One master spray tip was developed having an air flow at 70 psig of 0.375 cfm through 8 orifices disposed at equal angles ±3 degrees around the periphery of the tip. The size of the orifices was 0.0067 inches, inside diameter. The orifices were formed by electrical discharge machining to 0.0060 followed by abrasive flow machining. A total of five hundred additional spray tips conforming to the master were drilled to a nominal 0.0060 inches. Tests of twelve spray tips showed a flow rate at 70 psig of 0.315 cfm±0.035 cfm.

The master spray tip was loaded into a fixture which confined flow through the internal passages, and mounted in an abrasive flow machine. The machine was loaded with an abrasive medium comprising poly(borosiloxane) loaded with 1/10 part by weight of silicon carbide, 40 microns, per part of borosiloxane.

The machine was fitted with a sensor to measure $D_p$ and a timer which were sampled by a microprocessor at a rate of one reading each 0.1 seconds and computed $V_o$. Flow of the abrasive medium through the master established a reference $V_o$ for the medium and pressure employed. This figure was then employed as the reference value for all subsequent spray tips.

The five hundred spray tips were then each fitted on the machine and abrasive flow machined to the reference $V_o$. The average time to achieve the target $V_o$ was 7 seconds. The spray tips were then removed from the fixture, cleaned and tested. The sample population showed an air flow at 70 psig of 0.375 cfm minus 0.003, plus 0.002 cfm.

EXAMPLE II

Figure 4:
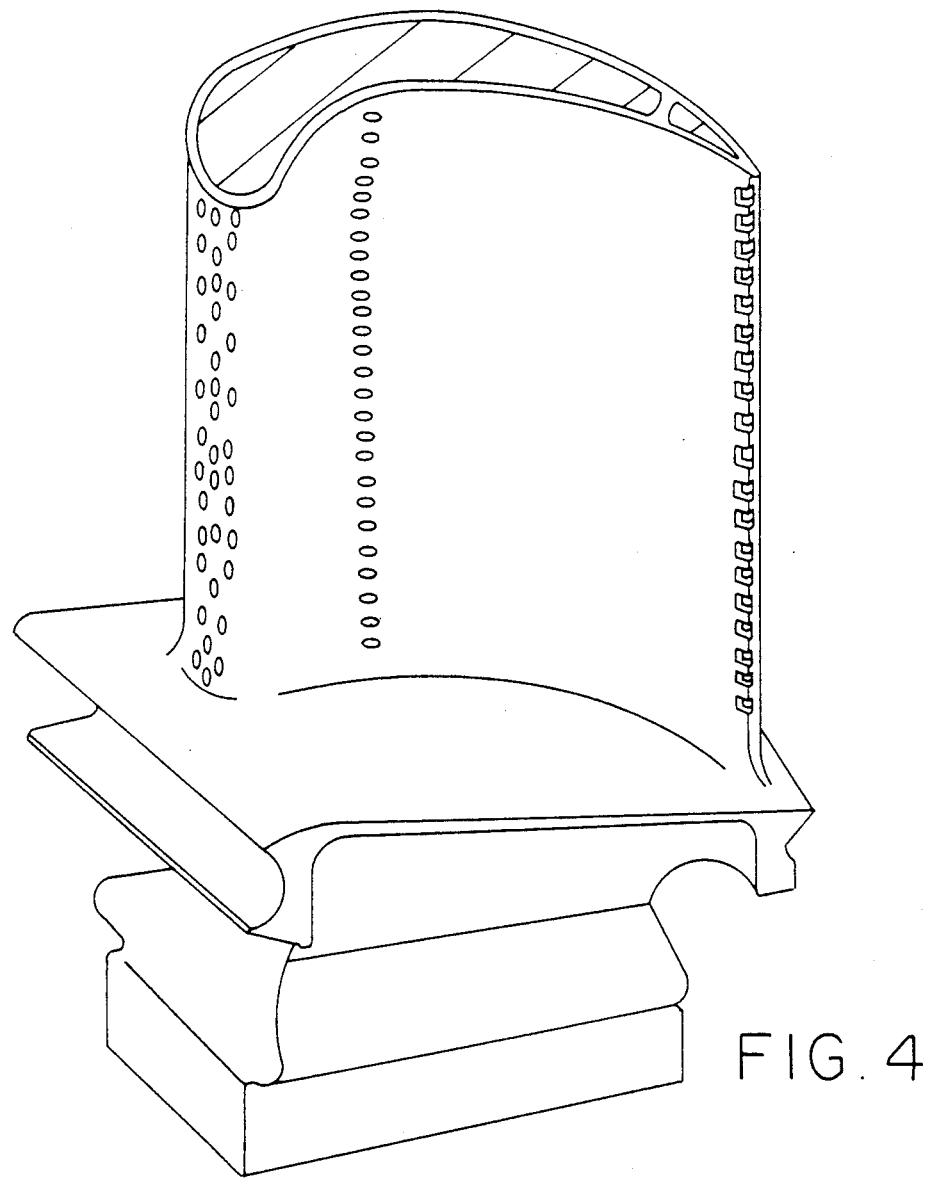
FIG. 4 is a perspective drawing showing the overall configuration of the turbine blade of FIG. 3.

Fifty turbine blades having the configuration shown in FIG. 4, with a span length of 3 inches and a chord of 1.2 inches were investment cast. One was drilled by laser to have a total of 216 orifices spaced equally along the span, in twelve rows, each having a diameter of approximately 0.008 inches and then abrasive fow machined to approximately 0.010 inches. On another test rig, the master had an air flow at 75 psig of 1836 cfm; when all but one orifice was blocked, each orifice had an air flow at 75 psig of 8.5 cfm.

The remaining turbine blades were laser drilled with the same orifices to a nominal diameter of 0.022 inches and then mounted on an abrasive flow machining fixture, mounted in turn in the machine as in Example I, and machined to the reference $V_o$. The blades were then removed, cleaned, and tested at 75 psig and showed an air flow of 14.5 cfm±0.05 cfm.

What is claimed is:

1. The method of attaining a specific fluid flow resistance of a given fluid through an orifice in a structure by working said orifice with a visco-elastic abrasive medium, whereby said visco-elastic medium is extruded through said orifice by means of a piston displacement pump, the steps comprising:
   A. determining a target flow rate of said visco-elastic abrasive medium at a constant applied pressure as will provide said specific fluid flow resistance of said given fluid;
   B. extruding said visco-elastic abrasive medium through said orifice with said piston displacement pump to work said orifice while maintaining said constant applied pressure on said visco-elastic abrasive medium with said piston displacement pump;
   C. measuring the dynamic flow rate of said visco-elastic abrasive medium through said orifice while said visco-elastic abrasive medium is being extruded therethrough, and permitting said flow rate to increase in proportion to the processing effected on said orifice; and
   D. stopping the extrusion of said visco-elastic abrasive medium through said orifice when said dynamic flow rate is equal to said target flow rate.

2. The method of claim 1 wherein said target flow rate is determined by pumping a standard fluid through a master orifice, having said specific fluid flow resistance of said given fluid.

3. The method of claim 2 wherein said target flow rate is determined by using said visco-elastic abrasive as said standard fluid and extruding said visco-elastic abrasive medium through said master orifice with said pump and maintaining said constant applied pressure while measuring the dynamic flow rate of said medium through said master orifice.

4. The method of claim 3 wherein said dynamic flow rate is measured as a function of the axial displacement of said piston per unit time.

5. The method of claim 4 wherein said function is $$V_o = kD_p/t.$$

and $V_o$ is the orifice velocity of the visco-elastic abrasive medium, $D_p/t$ is the piston displacement per unit of time, and k is a constant value.

6. The method of claim 5, wherein $k = A_p/A_o$, and $A_p$ is the cross-sectional area of the piston and $A_o$ is the cross-sectional area of the orifice.

7. The method of claim 4 wherein said unit time is less than about one second.

8. The method of claim 4 wherein said unit time is less than or equal to about 0.1 second.

9. The method of attaining a specific fluid flow resistance of a given fluid through an orifice in a structure by working said orifice with a visco-elastic abrasive medium, whereby said visco-elastic medium is pumped through said orifice by means of a piston displacement pump, the steps comprising:
   A. determining a target applied pressure of said visco-elastic abrasive medium at a constant flow rate as will provide said specified fluid flow resistance of said given fluid;
   B. extruding said visco-elastic abrasive medium through said orifice with said piston displacement pump to work said orifice while maintaining said constant flow rate of said visco-elastic abrasive medium with said piston displacement pump;
   C. measuring the dynamic applied pressure of said visco-elastic abrasive medium through said orifice while said visco-elastic abrasive medium is being extruded therethrough, and permitting the applied pressure on said visco-elastic abrasive medium to decrease in proportion to the processing effected on said orifice; and
   D. storing the extrusion of said visco-elastic abrasive medium through said orifice when said dynamic applied pressure is equal to said target applied pressure.

10. The method of claim 9 wherein said target applied pressure is determined by pumping a standard fluid through a master orifice, having said specific fluid flow resistance of said given fluid.

11. The method of claim 10 wherein said target applied pressure is determined by using said visco-elastic abrasive as said standard fluid and extruding said visco-elastic abrasive medium through said master orifice with said pump and maintaining said constant flow rate while measuring the dynamic applied pressure on said medium through said master orifice.

* * * * *